United States Patent
Peachee

(10) Patent No.: US 6,731,439 B1
(45) Date of Patent: May 4, 2004

(54) ENVIRONMENT VIEWING ENABLING SYSTEM AND METHOD

(76) Inventor: Thomas Peachee, 30757 Canwood St., Agoura Hills, CA (US) 91301

(*) Notice: Subject to any disclaimer, the term of this patent is extended or adjusted under 35 U.S.C. 154(b) by 0 days.

(21) Appl. No.: 10/272,530

(22) Filed: Oct. 16, 2002

(51) Int. Cl.$^7$ ................................................. G02B 7/02
(52) U.S. Cl. ....................................... 359/813; 359/824
(58) Field of Search ................................ 359/813, 814, 359/819, 822, 823, 824

(56) References Cited

U.S. PATENT DOCUMENTS

| | | |
|---|---|---|
| 2,507,559 A | 5/1950 | D'Andrea |
| 2,634,444 A | 4/1953 | Coleman |
| 3,208,090 A | 9/1965 | Roesel, Jr. |
| D215,245 S | 9/1969 | Schwab |
| 3,492,685 A | 2/1970 | Curzon |
| 3,527,524 A | 9/1970 | Pace et al. |
| 3,609,793 A | 10/1971 | Kaftan |
| 3,759,621 A | 9/1973 | De Carlo |
| 4,169,382 A | 10/1979 | Goldman et al. |
| 4,538,547 A | 9/1985 | Del Rosario |
| 4,709,657 A | 12/1987 | Gothard |
| 4,921,614 A | 5/1990 | Frickman et al. |
| 4,951,607 A | 8/1990 | Lapeyre |
| 4,977,637 A | 12/1990 | Demers |
| 5,000,118 A | 3/1991 | Merritt et al. |
| D328,910 S | 8/1992 | Wallace |
| 5,515,570 A | 5/1996 | Muscroft |
| 5,778,824 A | 7/1998 | Musgrave et al. |
| 5,857,430 A | 1/1999 | Griffiths |
| 5,988,109 A | 11/1999 | Rofen |
| 6,206,978 B1 | 3/2001 | Tsui |
| 6,348,104 B1 | 2/2002 | Bakker |

*Primary Examiner*—Ricky Mack
(74) *Attorney, Agent, or Firm*—Fulwider Patton Lee & Utecht, LLP

(57) ABSTRACT

An environment viewing enabling system for enabling viewing of an environment through a partition. The system enables clear and magnified viewing of the environment therethrough at controllably moveable locations thereof about the partition.

42 Claims, 7 Drawing Sheets

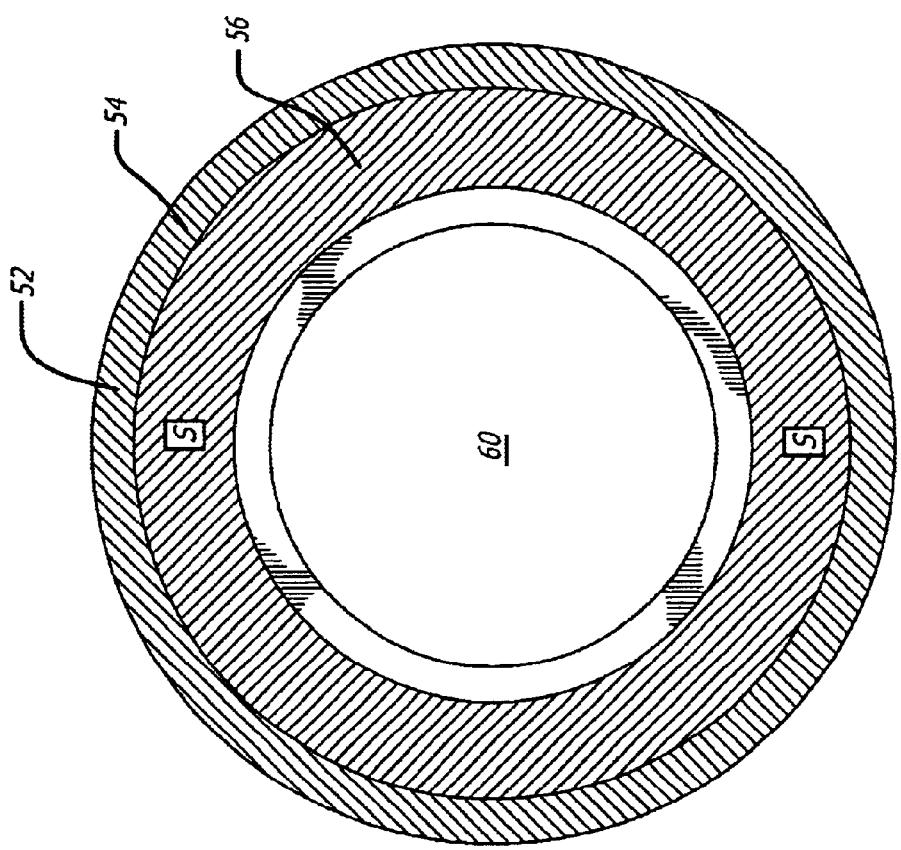
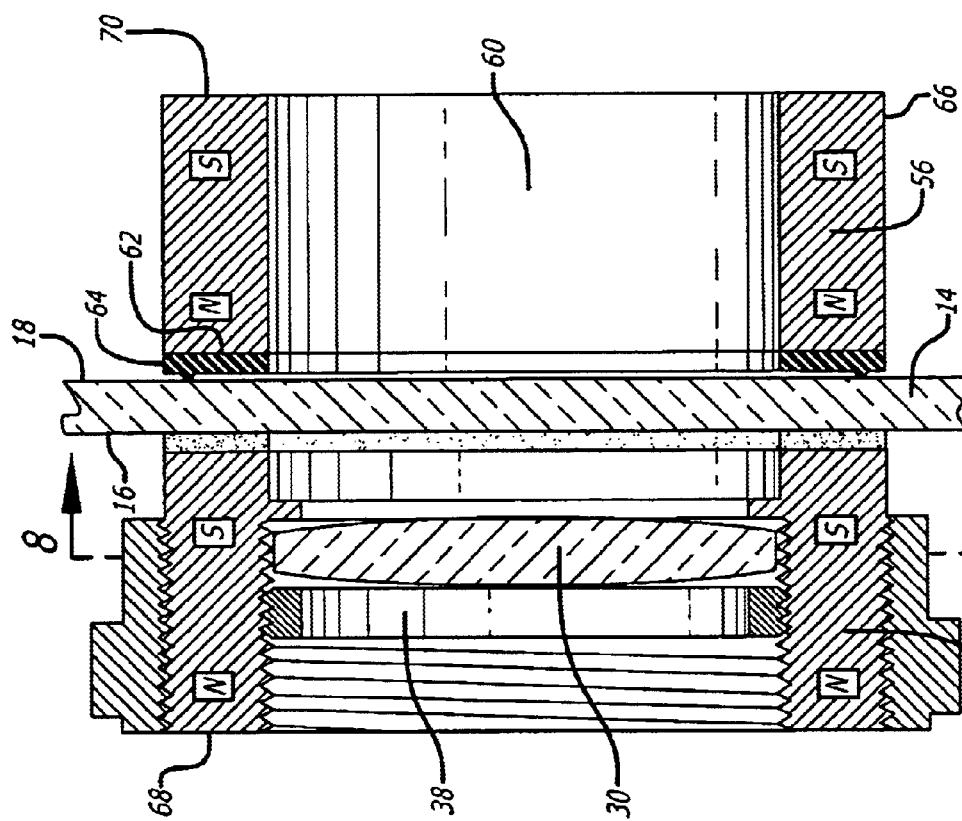

ENVIRONMENT VIEWING ENABLING SYSTEM AND METHOD

BACKGROUND OF THE INVENTION

1. Field of the Invention

The present invention relates generally to viewing systems and methods, and more particularly, to an environment viewing enabling system for enabling controlled and effective viewing of an environment.

2. Description of the Related Art

An environment viewing system enables the user to view an environment such as one which includes a partition, so as to provide a view of the environment through the partition, as for viewing a specimen or specimens in a tank environment. The tank environment is bounded by the partition such as panes of glass or acrylic. The tank environment may consist of a marine tank environment, with marine specimens therein, or a dry tank environment, with land specimens therein.

Environment viewing systems may be used by hobbyists, researchers, students, or others, for effective viewing of a specimen or specimens in a tank environment through a partition. Such a system may include a magnifying lense to enhance observation of the specimen or specimens. However, for effective viewing, the partition surfaces should be clean to enable clear viewing therethrough. Further, the system should be controllable and movable to enable viewing at a variety of locations. Also, magnification may be variable for enabling enhanced viewing.

Therefore, there has existed a need for a system which is capable of providing viewing of an environment through a partition in an efficient and effective manner. The present invention fulfills these needs.

SUMMARY OF THE INVENTION

Briefly, and in general terms, the present invention provides improved viewing of an environment through a partition.

The system enables viewing in an environment wherein the environment includes a partition for partitioning the environment from an external environment, and the partition includes an exterior surface and an interior surface. The system comprises an exterior housing, positionable on the exterior surface of the partition and slidably moveable thereabout. The exterior housing includes a frame, which includes a magnet therein having a facing surface for facing the exterior surface of the partition, which facing surface has a polarity. The frame further has a central opening for enabling viewing the environment therethrough. The system further comprises an interior housing, positionable on the interior surface of the partition and slidably moveable thereabout in alignment and coordination with and under the control of slidable movement of the exterior housing. The interior housing includes a frame which includes a magnet therein having a facing surface adapted to face the interior surface of the partition, which facing surface has a polarity. The polarity of the exterior housing frame magnet facing surface and the interior housing frame magnet facing surface are the opposite of each other, and interact so as to enable the movement of the exterior housing to control the movement of the interior housing. The interior housing frame further has a central opening for enabling viewing the environment therethrough.

One aspect of the present invention is that the system provides efficient and effective viewing through a partition in relation to an environment.

Another aspect of the present invention is that the system enables securely aligned and controllably moveable positioning thereof to various locations on the partition, for a variety of viewing opportunities.

A further aspect of the present invention is that the system may provide magnified viewing in the environment, and at variable magnifications and adjustable fields of depth.

A still further aspect of the present invention is that the system may clean partition surfaces upon movement thereof, to enable improved clear viewing therethrough.

Other features and advantages will become apparent from the following detailed description, taken in conjunction with the accompanying drawings, which describe and illustrate, by way of example, the features of the invention.

BRIEF DESCRIPTION OF THE DRAWINGS

FIG. 7 is an elevational cross-sectional view of the system and partition in a single magnet exterior housing and interior housing version of the system in accordance with the present invention.

FIG. 8 is a front elevational view of the single magnet exterior housing and interior housing version of the system in FIG. 7 in accordance with the present invention, taken along line 7—7.

DETAILED DESCRIPTION OF THE PREFERRED EMBODIMENTS

Figure 1:
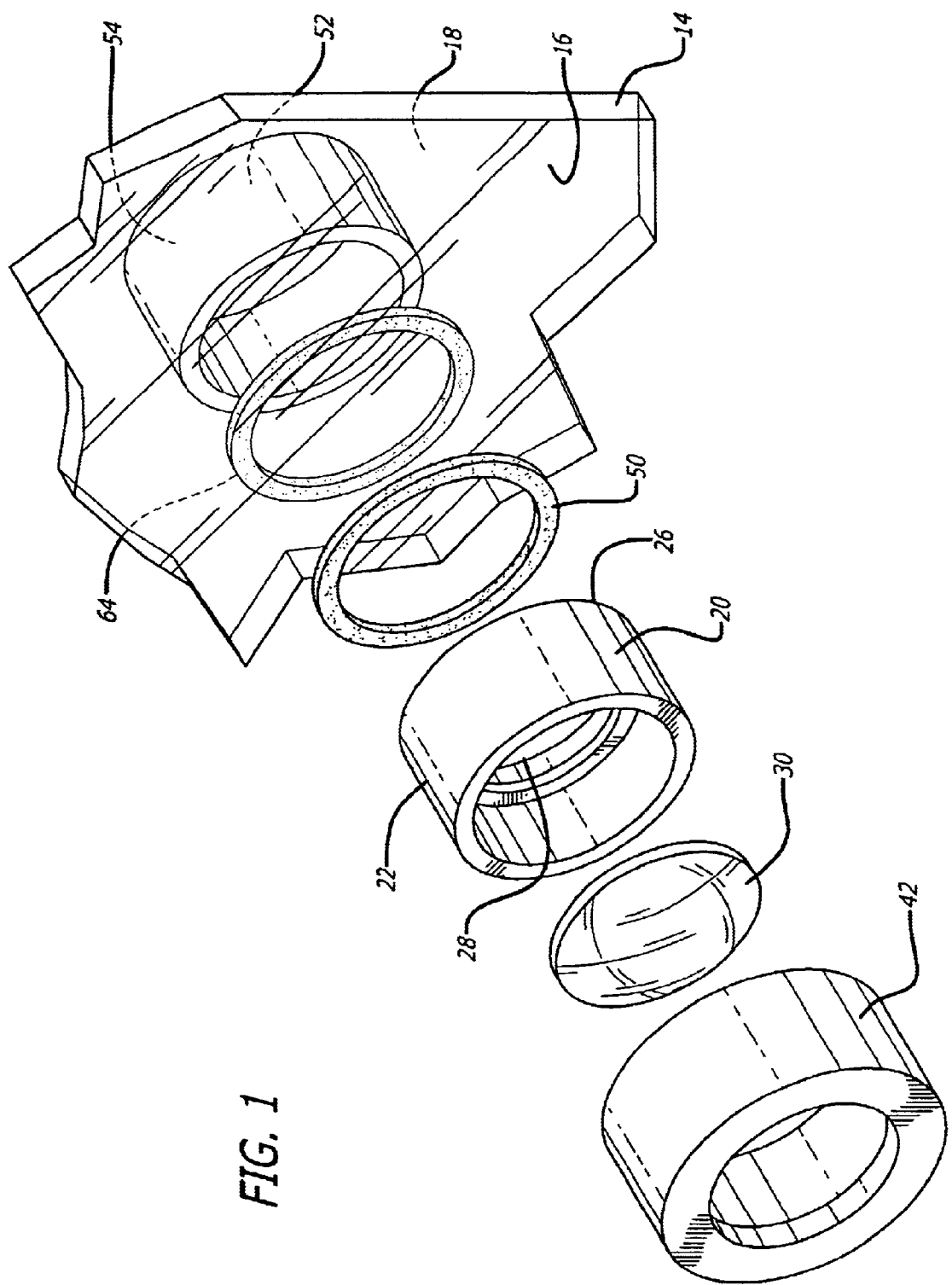
FIG. 1 is an exploded perspective view of an environment viewing enabling system and partition in an embodiment in accordance with the present invention.

Referring to the drawings, and in particular to FIGS. 1–8, there is shown a system 10 for example for enabling magnified viewing of a specimen or specimens in a tank environment 12. The tank environment 12 includes a partition 14, for partitioning the tank environment 12 from an external environment, and the partition 14 includes an exterior surface 16 and an interior surface 18. The tank environment 12 may for example constitute a marine tank environment, with marine specimens therein, such as fish, invertebrates, corals, crustaceans, clams, or shrimp. It may alternatively constitute a dry tank environment, for example with reptiles, amphibians, or insects therein. It may still further for example constitute a display case for jewelry, crystals, or gemstones or for museum artifacts. The partition 14 may for example be comprised of glass or acrylic.

Figure 2:
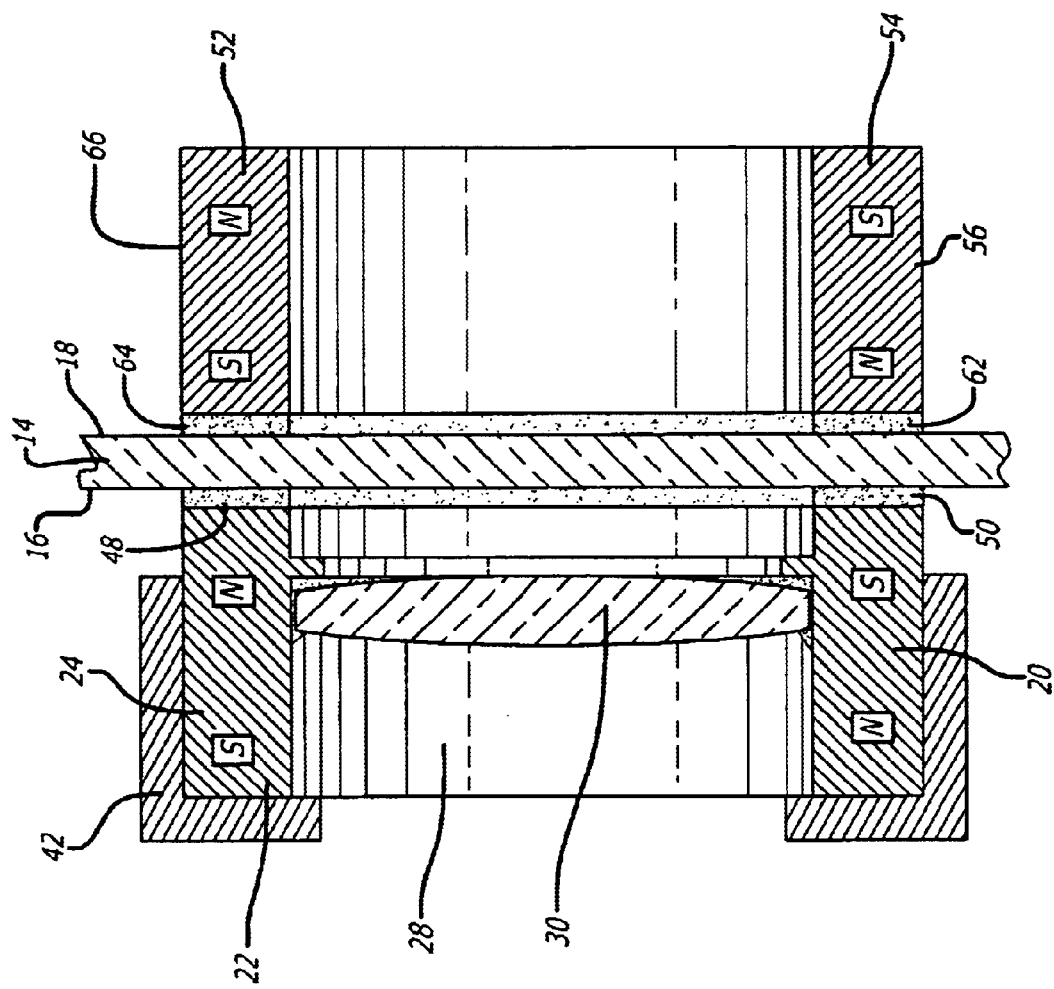
FIG. 2 is an elevational cross-sectional view of the system in FIG. 1 in accordance with the present invention.
Figure 3:
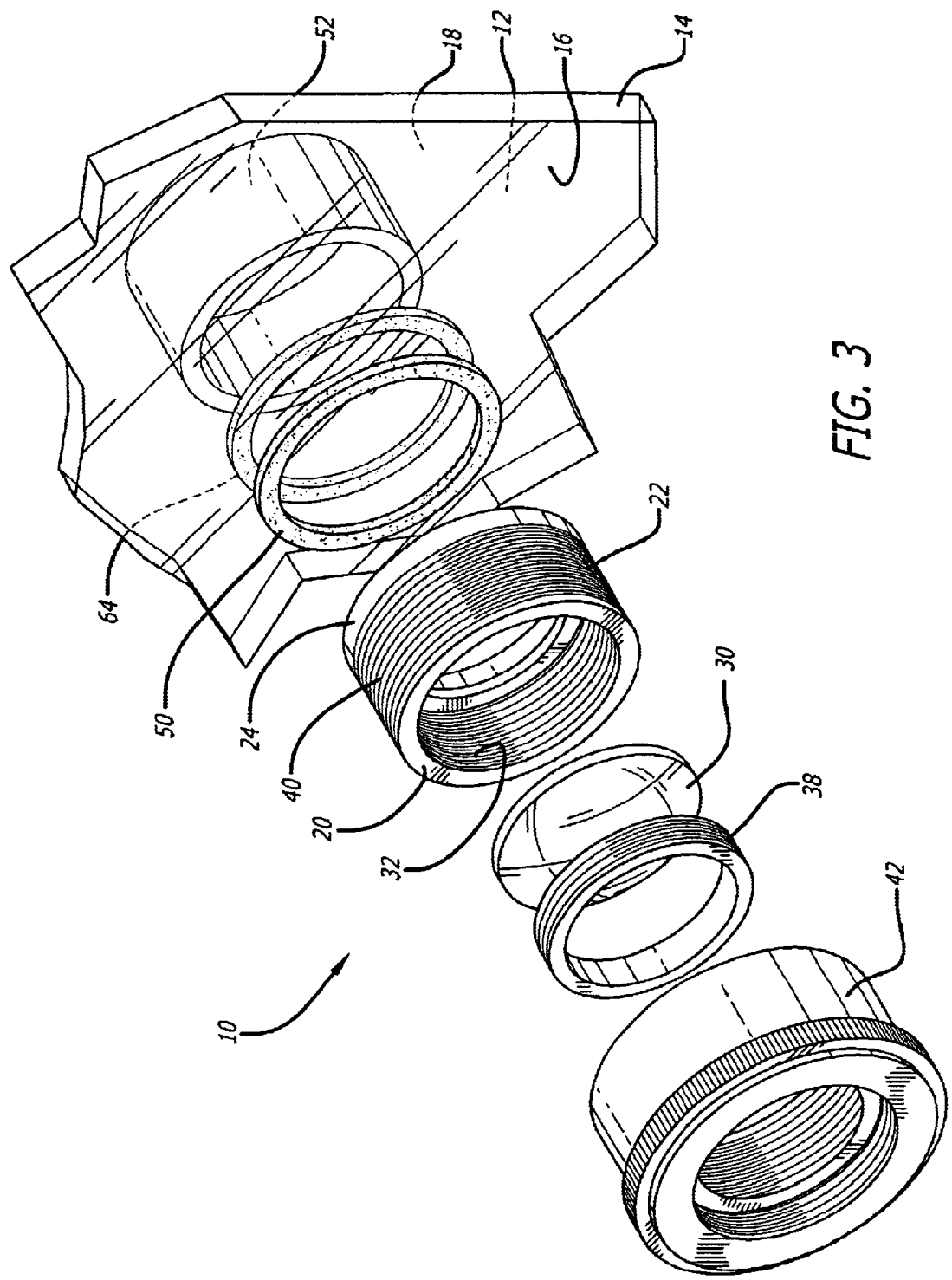
FIG. 3 is an exploded perspective view of an environment viewing enabling system and partition in another embodiment in accordance with the present invention.
Figure 4:
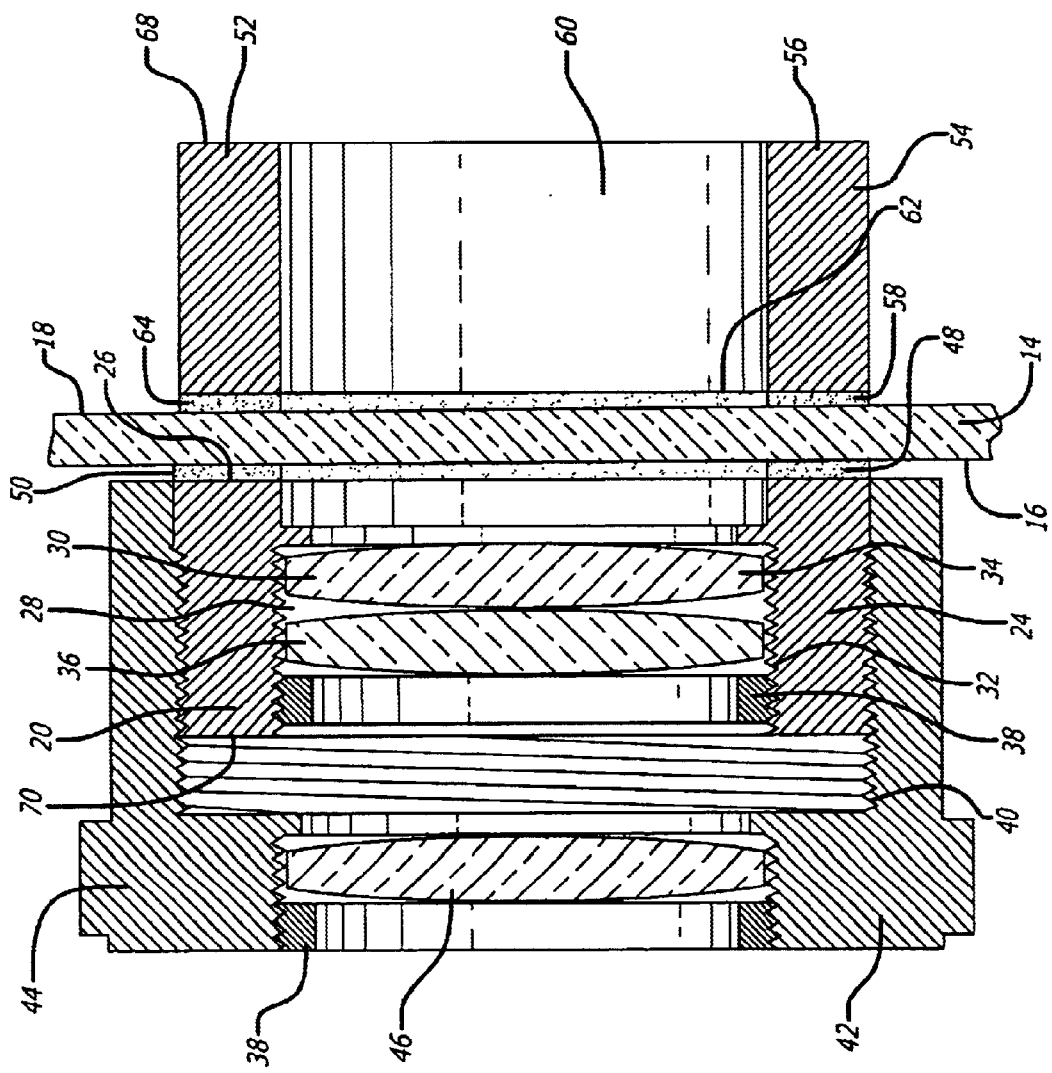
FIG. 4 is an elevational cross-sectional view of the system in FIG. 3 in accordance with the present invention.
Figure 5:
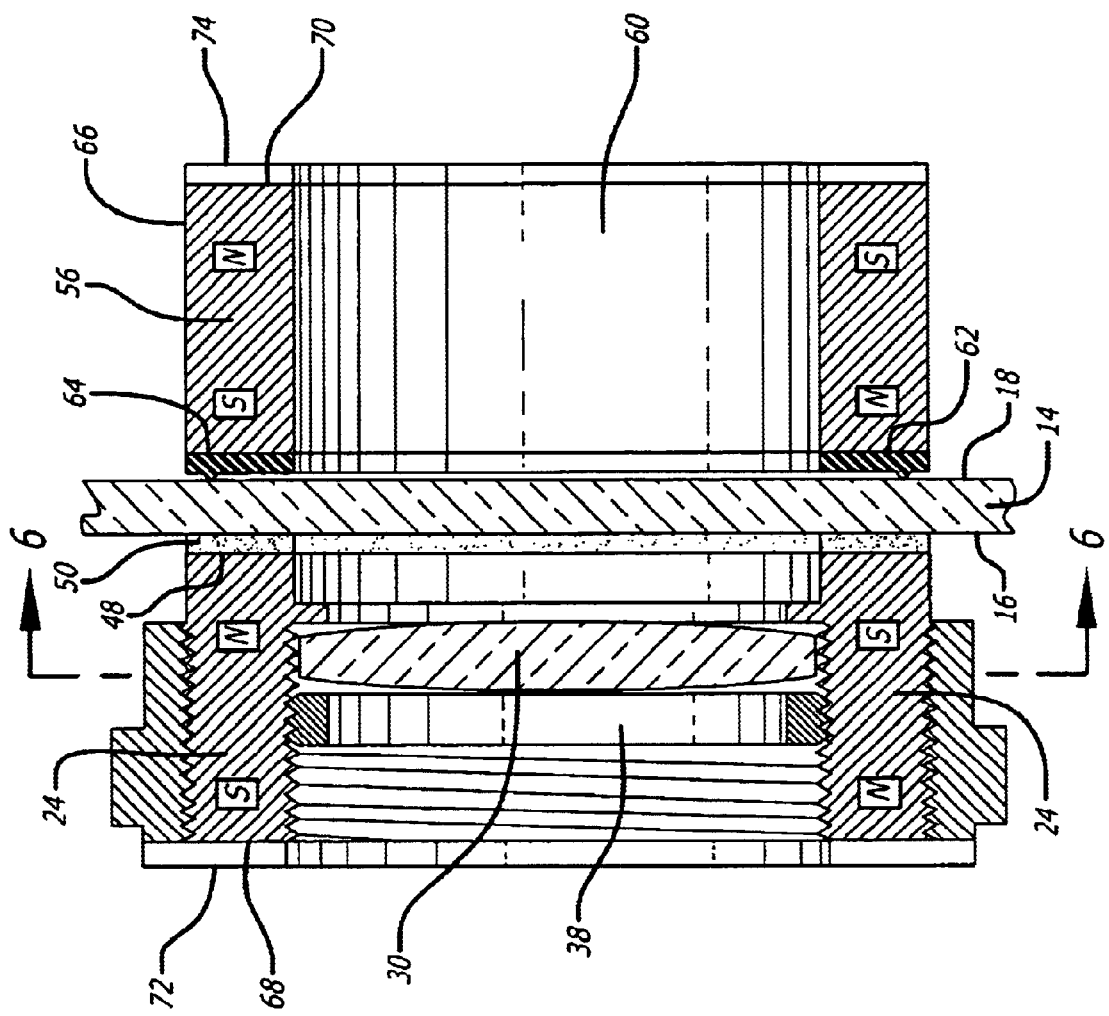
FIG. 5 is an elevational cross-sectional view of the system and partition in a multiple magnet exterior housing and interior housing version of the system in accordance with the present invention.
Figure 6:
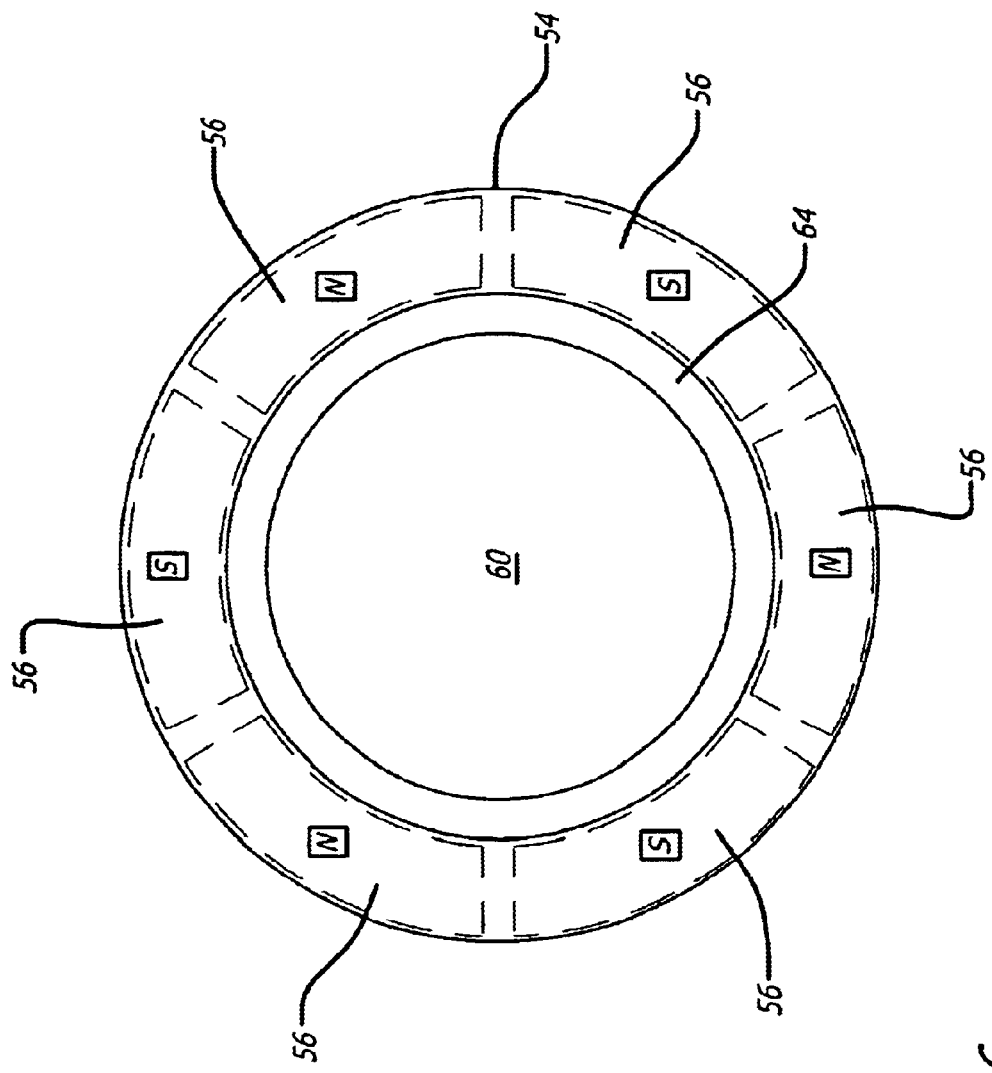
FIG. 6 is a front elevational view of the multiple magnet exterior housing and interior housing version of the system in FIG. 5 in accordance with the present invention, taken along line 6—6.

The system 10 may be provided in a variety of shapes and sizes, including for example round, square, or rectangular shapes, and large or small sizes. It includes an exterior housing 20, positionable on the exterior surface 16 of the partition 14 and slidably moveable thereabout. The exterior housing 20 includes a frame 22, which, as shown in FIGS. 5-6, may include a series of magnets 24 therein, each having a facing surface 26 which is able to face the exterior surface 16 of the partition 14, which facing surface 26 has a polarity. Alternatively, for example, the exterior housing frame 22, as seen in FIGS. 7–8, may include a single magnet 24 which includes a facing surface 26 having a polarity. The exterior housing frame 22 further has a central opening 28, for enabling viewing therethrough. It may alternatively include a magnifying lens 30 mounted in the central opening 28 for enabling the magnified viewing of the specimen in the tank environment 12 therethrough. The exterior housing frame 22 may include interior threads 32, as shown in FIGS. 3–4, to enable the magnifying lens 30, an interchangeable magnifying lens 34, and/or an additional magnifying lens or lenses 36, to be secured therein for example by a retaining ring 38 threadably retained therein. In the embodiment wherein the exterior housing frame 22 does not include interior threads as depicted in FIGS. 1–2, the magnifying lens 30 may be glued or otherwise secured therein. The exterior housing frame 22 may in addition include a light filter or light filters therein.

The exterior housing frame 22 also may also include exterior threads 40, for enabling accessories to be secured thereto, such as a finishing ring 42, an additional housing 44, or a further lens or lenses 46. Other accessories which may be secured thereto include for example a telescope lens housing, a microscope lens housing, a light source, a light filter, a camera, or a videocamera. Such accessories may be connected to the exterior housing frame for example by screw threading or adapter coupling thereto. The magnifying lens 30, interchangeable magnifying lens 34, additional magnifying lens or lenses 36, and further lens or lenses 46 provide focusability, varying magnifications, and varying depths of field.

The exterior housing frame 22 further includes a facing surface 48 which can face the partition exterior surface 16, and a pad 50 secured to the facing surface 48. The exterior housing frame 22 may further include an element for enabling adjustable movement of a magnifying lens relative to the frame central opening 28, such as a thumb set screw or rotatable adapter housing for enabling relative movement thereof. The exterior housing frame 22 and the interior housing frame 54 may each further include an element, such as ball bearings comprised for example of Teflon, mounted on the facing surfaces 26 and 58 thereof, for further enabling slidable movement about the partition exterior surface 16 and interior surface 18, for example in an oversized environment such as a very large tank environment 12 with very strong exterior and interior magnets 24 and 56.

The system 10 also includes an interior housing 52, positionable on the interior surface 18 of the partition 14 and slidably moveable there about, in alignment and coordination with and under the control of slidable movement of the exterior housing 20. The interior housing 52 includes a frame 54 which may include a series of magnets 56 therein, each having a facing surface 58 which is able to face the interior surface 18 of the partition 14, which facing surface 58 has a polarity. The interior housing frame 52 may alternatively, for example, include a single magnet 56 which includes a facing surface 58 having a polarity. The interior housing frame 54 further has a central opening 60 for enabling the viewing of the specimen in the tank environment 12 therethrough. The interior housing frame 54 may also include exterior threads, to which accessories may be attached such as for example a feeding tube extension or a pregnant fish netted birthing bag. It may include interior threads, for example in an environment such as a marine environment where external threads may create problems, for connecting an accessory such as a feeding station or a branch surface. The interior housing frame 54 further includes a facing surface 62 which can face the partition interior surface 18, and a pad 64 secured to the facing surface 62.

The tank environment 12 may constitute a marine tank environment, and the interior housing frame magnets or magnet 56 may include a material such as nickel plating covering the exterior surfaces or surface 66 thereof, for preventing leaching of the magnet material, iron, or chemicals, into the marine tank environment. In such marine tank environment, the pad 64 may be comprised of a material for enabling the cleaning of the partition interior surface 18, for example from algae or the like, upon movement of the interior housing 52, to enable a clear field of view of the specimen in the tank, and may be adhesive-backed. The pad 64 material in such environment may consist of a vinyl or dense pile material, and may be replaceable. The tank environment 12 may alternatively constitute a dry tank environment, wherein the pad 64 may consist of a material for enabling the dry viewing of the specimen in the tank, and may be adhesive-backed. The pad 64 material in such environment may comprise a vinyl or felt pad, and may be replaceable. For large specimen tanks, which may require strong magnets to enable controlled movement of the exterior housing frame 22 and the interior housing frame 54, a pair of handles may be incorporated into the exterior housing frame 22 for gripping in aid of movement thereof.

The polarity of the facing surfaces 26 of the series of exterior housing frame magnets 24 or the facing surface 26 of the single exterior housing frame magnet 26, and the facing surfaces 58 of the series of interior housing frame magnets 56 or the facing surface 42 of the single interior housing frame magnet 40, are the opposite of each other, constituting opposing north and south poles, and interact so as to enable the movement of the exterior housing 20 to control the movement of the interior housing 52. The magnetic attraction of the opposite polarity of the series of exterior housing frame magnets 24 or the single exterior housing frame magnet 24, and the series of interior housing frame magnets or the single interior housing frame magnet 56 is able to maintain the alignment of the exterior housing frame 22 and the interior housing frame 54, while preventing separation and detachment thereof. The dry tank environment pad 64 may minimize resistance to movement and inhibit scratching of the partition 14. A consideration regarding the strength of the series of exterior housing frame magnets 24 or the single exterior housing frame magnet 24, and the series of interior housing frame magnets 56 or the single interior housing frame magnet 56 is the thickness of the partition 14.

The opposite polarity of the exterior housing frame magnet 24 and the interior housing frame magnet 56 generates a path of magnetic flux therebetween. The exterior housing frame 22 further includes an opposite surface 68 thereof, which is able to face away from the partition exterior surface 16, and the interior housing frame 54 further includes an opposite surface 70 thereof, which is able to face away from the partition interior surface 18. The exterior housing frame 22 may further include a steel plate 72 located on the opposite surface 68, and the interior housing frame 54 may further include a steel plate 74 located on the opposite surface 70, as seen in FIG. 5. The exterior housing frame steel plate 72 and the interior housing frame steel plate 74 complete the path of magnetic flux between the exterior housing frame magnets or magnet 24 and the interior housing frame magnets or magnet 56, reducing reluctance so as to provide additional magnetic force. The exterior housing frame magnets or magnet 24 and the interior housing frame magnets or magnet 56 may be comprised of permanent rare earth magnets. The permanent rare earth magnets or magnet 24 and 56 may be comprised of Neodymium.

As illustrated in FIGS. 1–8, in a method for example for the use of the system 10, the user may position the exterior housing 20 on the exterior surface 16 of the partition 14 so as to position the exterior housing frame pad 50, which in the dry tank environment may constitute a dry viewing enabling material pad such as felt, on the partition exterior surface 16. Adjustable movement of the magnifying lens 30 in the frame central opening 28 may be effected by actuation of an adjustable movement enabling element such as for example a thumb set screw. Slidable movement of the exterior housing 20 may further be assisted by a facing-surface mounted element such as ball bearings for example consisting of Teflon. Interchangeable magnifying lenses 34 may be interchanged in the exterior housing frame 22 for variation of specimen magnification, or alternatively the additional magnifying lenses 36 and/or the further magnifying lenses 46 may be connected thereto or inserted therein for such variation. The user may also position the interior housing 52 on the interior surface 18 of the partition 16, such that the interior housing frame pad 64, which in the marine tank environment may consist of a partition inner surface cleaning enabling material pad such as a dense pile pad, is positioned on the partition interior surface 18. Leaching of the magnet material from the interior housing frame magnets or magnet 56 in a marine tank environment is prevented by leaching-preventing material such as nickel plating covering the magnet.

The opposite polarity interaction of the exterior housing frame magnets or magnet 24, which may consist of a permanent rare earth magnet such as a Neodymium magnet, and the interior housing frame magnets or magnet 56, which also may consist of a permanent rare earth magnet such as a Neodymium magnet, enable the movement of the exterior housing 20 to control the movement of the interior housing 52. Alignment of the exterior housing frame 22 and the interior housing frame 54 is maintained responsive to the opposite polarity of the exterior housing frame magnet 24 and the interior housing frame magnet 56. An addition of the exterior frame steel plate 72 to the exterior housing frame 22 and the interior frame steel plate 74 to the interior housing frame 54 completes the path of magnetic flux between the exterior housing frame magnets or magnet 24 and the interior housing frame magnets or magnet 56.

While the system 10 has been shown and described in connection with the magnified viewing of a specimen or specimens in a tank environment, it may alternatively enable non-magnified viewing therein, or magnified or non-magnified viewing in any environment which includes a partition, such as for example a display case or an enclosure.

From the foregoing it will be appreciated that the system of the present invention provides advantages in enabling controlled manipulation of viewer housings for viewing in an environment. While several particular forms of the invention have been illustrated and described, it will be apparent that various modification can be made without departing from the spirit and scope of the invention. Accordingly, the invention is not to be limited, except as by the following claims.

What is claimed is:

1. A system for enabling viewing in an environment, wherein the environment includes a partition for partitioning the environment from an external environment, and the partition includes an exterior surface and an interior surface, comprising:
    an exterior housing, adapted to be positioned on the exterior surface of the partition and to be slidably moveable thereabout, including a frame, which includes a magnet therein having a facing surface adapted to face the exterior surface of the partition, which facing surface has a polarity, and which frame further has a central opening for enabling viewing the environment therethrough; and
    an interior housing, adapted to be positioned on the interior surface of the partition and to be slidably moveable thereabout in alignment and coordination with and under the control of slidable movement of the exterior housing, including a frame which includes a magnet therein having a facing surface adapted to face the interior surface of the partition, which facing surface has a polarity, wherein the polarity of the exterior housing frame magnet facing surface and the interior housing frame magnet facing surface are the opposite of each other and interact so as to enable the movement of the exterior housing to control the movement of the interior housing, and wherein the interior housing frame further has a central opening for enabling viewing the environment therethrough.

2. The system of claim 1, wherein the environment comprises a tank environment, the system is adapted to enable the magnified viewing of a specimen in the tank environment, and the exterior housing further includes a magnifying lens mounted in the frame central opening for enabling magnified viewing of the specimen in the tank environment therethrough.

3. The system of claim 2, wherein the exterior housing frame further includes a facing surface thereof adapted to face the partition exterior surface, and a pad secured to the facing surface thereof.

4. The system of claim 2, wherein the interior housing frame further includes a facing surface thereof adapted to face the partition interior surface, and a pad secured to the facing surface thereof.

5. The system of claim 2, wherein the exterior housing frame is adapted to enable an interchangeable magnifying lens to be interchanged with the magnifying lens mounted therein.

6. The system of claim 2, wherein the exterior housing frame further includes a plurality of magnifying lenses associated therewith.

7. The system of claim 2, wherein the magnetic attraction of the opposite polarity of the exterior housing frame magnet facing surface and the interior housing frame facing surface is adapted to maintain the alignment of the exterior housing frame and the interior housing frame.

8. The system of claim 2, wherein the exterior housing frame includes a plurality of magnets therein, the interior housing frame includes a plurality of magnets therein, and the polarity of the facing surfaces of the exterior housing frame plurality of magnets and the facing surfaces of the interior housing frame plurality of magnets are the opposite of each other so as to enable the movement of the exterior housing to control the movement of the interior housing.

9. The system of claim 2, wherein the exterior housing frame further includes a facing surface thereof, adapted to face the partition exterior surface, and an opposite surface thereof, adapted to face away from the partition exterior surface, the interior housing frame further includes a facing surface thereof, adapted to face the partition interior surface, and an opposite surface thereof, adapted to face away from the partition exterior surface, the opposite polarity of the exterior housing frame magnet facing surface and the interior housing frame magnet facing surface generates a path of magnetic flux therebetween, the exterior housing frame further includes a steel plate located on the opposite surface thereof, the interior housing frame further includes a steel plate located on the opposite surface thereof, and the exterior frame steel plate and the interior frame steel plate complete the path of magnetic flux between the exterior housing frame magnet and the interior housing frame magnet.

10. The system of claim 2, wherein the exterior housing frame is adapted to enable adjustable movement of the magnifying lens in the frame central opening, and further includes an element for enabling adjustable movement of the magnifying lens in the frame central opening.

11. The system of claim 2, wherein the exterior housing frame further includes an element mounted on the facing surface for further enabling slidable movement about the partition exterior surface.

12. The system of claim 2, wherein the tank environment comprises a marine tank environment, and the interior housing frame magnet includes a material covering the exterior surface thereof for preventing leaching of the magnet material into the marine tank environment.

13. The system of claim 2, wherein the exterior housing frame magnet and the interior housing frame magnet are comprised of permanent rare earth magnets.

14. The system of claim 3, wherein the tank environment comprises a dry tank environment, and the pad is comprised of a material for enabling the dry viewing of the specimen in the tank.

15. The system of claim 4, wherein the tank environment comprises a marine tank environment, and the pad is comprised of a material for enabling the cleaning of the partition interior surface upon movement of the interior housing for enabling the viewing of the specimen in the tank.

16. The system of claim 13, wherein the permanent rare earth magnets comprise Neodymium magnets.

17. The system of claim 14, wherein the pad material comprises felt.

18. The system of claim 15, wherein the pad material comprises a dense pile material.

19. A system for enabling viewing in an environment, wherein the environment includes a partition for partitioning the environment from an external environment, and the partition includes an exterior surface and an interior surface, comprising:
an exterior housing, adapted to be positioned on the exterior surface of the partition and to be slidably moveable thereabout, including a frame having a central opening for enabling viewing the environment therethrough;
an interior housing, adapted to be positioned on the interior surface of the partition and to be slidably moveable thereabout in alignment and coordination with and under the control of slidable movement of the exterior housing, including a frame having a central opening for enabling viewing the environment therethrough; and
a controlling medium, adapted to interact between the exterior housing and the interior housing so as to enable the movement of the exterior housing to control the movement of the interior housing.

20. The system of claim 19, wherein the environment comprises a tank environment, the system is adapted to enable the magnified viewing of a specimen in the tank environment, and the exterior housing further includes a magnifying lens mounted in the frame central opening for enabling magnified viewing of the specimen in the tank environment therethrough.

21. The system of claim 20, wherein the controlling medium comprises a magnet in the exterior housing frame having a facing surface adapted to face the exterior surface of the partition, which facing surface has a polarity, and a magnet in the interior housing frame having a facing surface adapted to face the interior surface of the partition, which facing surface has a polarity, wherein the polarity of the exterior housing frame magnet facing surface and the interior housing frame magnet facing surface are the opposite of each other and interact so as to enable movement of the exterior housing to control movement of the interior housing.

22. A method of enabling viewing in an environment, wherein the environment includes a partition for partitioning the environment from an external environment, and the partition includes an exterior surface and an interior surface, in a system which comprises an exterior housing, adapted to be positioned on the exterior surface of the partition and to be slidably moveable thereabout, including a frame having a central opening for enabling viewing the environment therethrough, an interior housing, adapted to be positioned on the interior surface of the partition and to be slidably moveable thereabout in alignment and coordination with and under the control of slidable movement of the exterior housing, including a frame having a central opening for enabling viewing the environment therethrough, and a controlling medium, adapted to enable the movement of the exterior housing to control the movement of the interior housing, wherein the method comprises:
positioning the exterior housing on the exterior surface of the partition; and
positioning the interior housing on the interior surface of the partition, such that the controlling medium enables the interior housing to be positioned in alignment and coordination with and under the control of the exterior housing.

23. The method of claim 22, wherein the environment comprises a tank environment, the system is adapted to enable the magnified viewing of a specimen in the tank environment, and the exterior housing further includes a magnifying lens mounted in the frame central opening for enabling magnified viewing in the environment therethrough.

24. The method of claim 23, wherein the controlling medium comprises a magnet in the exterior housing frame having a polarity, and a magnet in the interior housing frame having a polarity, wherein the polarity of the exterior housing frame magnet and the interior housing frame magnet are the opposite of each other, so as to enable movement of the exterior housing to control movement of the interior housing, further comprising positioning the interior housing on the interior surface of the partition, such that the opposite polarity of the exterior housing frame magnet and the interior housing frame magnet interact to enable the interior housing to be positioned in alignment and coordination with and under the control of the exterior housing.

25. A method of enabling viewing in an environment, wherein the environment includes a partition for partitioning the environment from an external environment, and the partition includes an exterior surface and an interior surface, in a system which comprises an exterior housing, adapted to be positioned on the exterior surface of the partition and to be slidably moveable thereabout, including a frame, which includes a magnet therein having a facing surface adapted to face the exterior surface of the partition, which facing surface has a polarity, and which frame further has a central opening for enabling viewing the environment therethrough, and an interior housing, adapted to be positioned on the interior surface of the partition and to be slidably moveable thereabout in alignment and coordination with and under the control of the slidable movement of the exterior housing, including a frame which includes a magnet therein having a facing surface adapted to face the interior surface of the partition, which facing surface has a polarity, wherein the polarity of the exterior housing frame magnet facing surface and the interior housing frame magnet facing surface are the opposite of each other, so as to enable the movement of the exterior housing to control the movement of the interior housing, and wherein the interior housing frame further has a central opening for enabling viewing the environment therethrough, wherein the method comprises:

positioning the exterior housing on the exterior surface of the partition; and positioning the interior housing on the interior surface of the partition, such that the opposite polarity of the exterior housing frame magnet and the interior housing frame magnet interact to enable the movement of the exterior housing to control the movement of the interior housing.

26. The method of claim 25, wherein the environment comprises a tank environment, the system is adapted to enable the magnified viewing of a specimen in the tank environment, and the exterior housing further includes a magnifying lens mounted in the frame central opening for enabling magnified viewing in the environment therethrough.

27. The system of claim 26, wherein the tank environment comprises a marine tank environment, and the interior housing frame magnet includes a material covering the exterior surface thereof for preventing leaching of the magnet material into the marine tank environment, further comprising the interior housing frame magnet material covering preventing leaching of the magnet material into the marine tank environment.

28. The method of claim 26, wherein the exterior housing frame further includes a facing surface thereof adapted to face the partition exterior surface, and a pad secured to the facing surface thereof, and wherein positioning the exterior housing further includes positioning the exterior housing frame pad on the partition exterior surface.

29. The method of claim 26, wherein the interior housing frame further includes a facing surface thereof adapted to face the partition interior surface, and a pad secured to the facing surface thereof, and wherein positioning the interior housing further includes positioning the interior housing frame pad on the partition interior surface.

30. The method of claim 26, wherein the exterior housing frame is adapted to enable an interchangeable magnifying lens to be interchanged with the magnifying lens mounted therein, further comprising interchanging the interchangeable magnifying lens with the magnifying lens mounted in the exterior housing frame.

31. The method of claim 26, wherein the exterior housing frame further includes a plurality of magnifying lenses associated therewith, further comprising associating the plurality of magnifying lenses with the exterior housing frame.

32. The method of claim 26, wherein the magnetic attraction of the opposite polarity of the exterior housing frame magnet facing surface and the interior housing frame facing surface is adapted to maintain the alignment of the exterior housing frame and the interior housing frame, further comprising maintaining the alignment of the exterior housing frame and the interior housing frame responsive to the opposite polarity of the exterior housing frame magnet and the interior housing frame magnet.

33. The method of claim 26, wherein the exterior housing frame includes a plurality of magnets therein, the interior housing frame includes a plurality of magnets therein, and the polarity of the facing surfaces of the exterior housing frame plurality of magnets, and the facing surfaces of the interior housing frame plurality of magnets are the opposite of each other so as to enable the movement of the exterior housing to control the movement of the interior housing, and wherein positioning the interior housing further comprises positioning thereof such that the opposite polarity of the exterior housing frame plurality of magnets and the interior housing frame plurality of magnets interact to enable the exterior housing to control the movement of the interior housing.

34. The method of claim 26, wherein the exterior housing frame further includes a facing surface thereof, adapted to face the partition exterior surface, and an opposite surface thereof, adapted to face away from the partition exterior surface, the interior housing frame further includes a facing surface thereof, adapted to face the partition interior surface, and an opposite surface thereof, adapted to face away from the partition exterior surface, the opposite polarity of the exterior housing frame magnet facing surface and the interior housing frame magnet facing surface generates a path of magnetic flux there between, the exterior housing frame further includes a steel plate located on the opposite surface thereof, the interior housing frame further includes a steel plate located on the opposite surface thereof, and the exterior frame steel plate and the interior frame steel plate complete the path of magnetic flux between the exterior housing frame magnet and the interior housing frame magnet, further comprising completing the path of magnetic flux between the exterior housing frame magnet and the interior housing frame magnet through the exterior frame steel plate and the interior frame steel plate.

35. The method of claim 26, wherein the exterior housing frame is adapted to enable adjustable movement of the magnifying lens in the frame central opening, and further includes an element for enabling adjustable movement of the magnifying lens in the frame central opening, further comprising actuating the element so as to adjustably move the magnifying lens in the central frame opening.

36. The system of claim 26, wherein the exterior housing frame further includes an element mounted on the facing surface for further enabling slidable movement about the partition exterior surface, further comprising further enabling slidable movement of the exterior housing frame about the partition exterior surface responsive to the slidable movement enabling element.

37. The method of claim 26, wherein the exterior housing frame magnet and the interior housing frame magnet are comprised of permanent rare earth magnets, and wherein positioning the interior housing further comprises positioning the interior housing on the interior surface of the partition, such that the opposite polarity of the exterior housing frame permanent rare earth magnet and the interior housing frame permanent rare earth magnet interact to enable position the interior housing to be positioned in alignment and coordination with and under the control of the exterior housing.

38. The method of claim 26, wherein the tank environment comprises a dry tank environment, and the pad is comprised of a material for enabling the dry viewing of the specimen in the tank, and wherein positioning the exterior housing further includes positioning the exterior housing frame dry viewing enabling material pad on the partition exterior surface.

39. The method of claim 29, wherein the tank environment comprises a marine tank environment, and the pad is comprised of a material for enabling the cleaning of the partition interior surface upon movement of the interior housing for enabling the viewing of the specimen in the tank, and wherein positioning the interior housing further includes positioning the interior housing frame cleaning enabling material pad on the partition interior surface.

40. The method of claim 37, wherein the permanent rare earth magnets comprise Neodymium magnets, and wherein positioning the interior housing further comprises positioning the interior housing on the interior surface of the partition, such that the opposite polarity of the exterior housing frame Neodymium magnet and the interior housing frame Neodymium magnet interact to enable position the interior housing to be positioned in alignment and coordination with and under the control of the exterior housing.

41. The method of claim 38, wherein the pad material comprises felt, and wherein positioning the exterior housing further includes positioning the exterior housing frame felt material pad on the partition exterior surface.

42. The method of claim 39, wherein the pad material comprises a dense pile material, and wherein positioning the interior housing further includes positioning the interior housing frame dense pile material pad on the partition interior surface.

* * * * *